(12) United States Patent
Vidojevic

(10) Patent No.: US 10,779,558 B2
(45) Date of Patent: Sep. 22, 2020

(54) POPCORN MACHINES HAVING GAS-FIRED RADIANT BURNERS AND ASSOCIATED SYSTEMS AND METHODS

(71) Applicant: C. Cretors & Company, Wood Dale, IL (US)

(72) Inventor: Nenad Vidojevic, Chesterton, IN (US)

(73) Assignee: C. Cretors & Company, Wood Dale, IL (US)

( * ) Notice: Subject to any disclaimer, the term of this patent is extended or adjusted under 35 U.S.C. 154(b) by 411 days.

(21) Appl. No.: 15/480,969

(22) Filed: Apr. 6, 2017

(65) Prior Publication Data

US 2017/0290360 A1 Oct. 12, 2017

Related U.S. Application Data

(60) Provisional application No. 62/319,088, filed on Apr. 6, 2016.

(51) Int. Cl.
| | | |
|---|---|---|
| *A23L 7/10* | (2016.01) | |
| *A47J 36/00* | (2006.01) | |
| *A23L 7/187* | (2016.01) | |

(52) U.S. Cl.
CPC ........... *A23L 7/187* (2016.08); *A23V 2002/00* (2013.01)

(58) Field of Classification Search
CPC ........ A23L 7/187; A23L 7/183; A47J 37/1228
See application file for complete search history.

(56) References Cited

U.S. PATENT DOCUMENTS

| 884,771 A | 4/1908 | Snow |
|---|---|---|
| 1,251,291 A | 12/1917 | Scheeffer |
| 1,308,241 A | 7/1919 | Hutchinson |
| 1,339,662 A | 5/1920 | Morgan |

(Continued)

FOREIGN PATENT DOCUMENTS

| CN | 203737561 | 7/2014 |
|---|---|---|
| DE | 8624682 | 12/1986 |

(Continued)

OTHER PUBLICATIONS

Induceramic, infrared honeycomb ceramic burner plate, using Wayback Machine, retrieved from https://web.archive.org/web/20140228035423/http://www.induceramic.com/industrial-ceramics-application/machinery-and-industrial-equipment/coating-equipment/infrared-honeycomb-ceramic-burner-plate, (Year: 2014).*

(Continued)

*Primary Examiner* — Dana Ross
*Assistant Examiner* — Lawrence H Samuels
(74) *Attorney, Agent, or Firm* — Perkins Coie LLP

(57) ABSTRACT

Popcorn machines having radiant burners and associated systems and methods are disclosed herein. In one embodiment, a popcorn machine includes a kettle assembly having a heating plate that separates an upper portion from a lower portion. The heating plate can include a coated lower surface to absorb radiant heat, and the kettle assembly can be supported by a base having a gas-fired radiant burner. The radiant burner can include a heating element positioned to direct radiant heat toward the heating plate. In several embodiments, the heating element includes an opening extending therethrough, and a coupler can extend through the opening to connect a motor in the base with a mixer in the upper portion of the kettle assembly.

18 Claims, 2 Drawing Sheets

(56) References Cited

U.S. PATENT DOCUMENTS

| | | |
|---|---|---|
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,786,877 A | 12/1930 | Thompson |
| 1,880,822 A | 10/1932 | Cook et al. |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A | 4/1951 | Gibson |
| 2,570,126 A | 10/1951 | Hobbs |
| 2,575,643 A | 11/1951 | Tamsen |
| 2,586,347 A | 2/1952 | Kloster |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A | 10/1959 | Bushway |
| 2,918,956 A | 12/1959 | Otto |
| 2,939,379 A | 6/1960 | Schmitt |
| 2,984,169 A | 5/1961 | Bushway |
| 3,095,326 A | 6/1963 | Green et al. |
| D196,811 S | 11/1963 | Lasar |
| 3,120,168 A | 2/1964 | Lippert |
| 3,140,952 A | 7/1964 | Cretors |
| 3,251,579 A | 5/1966 | Lasar |
| 3,280,720 A | 10/1966 | Kuhn |
| 3,291,304 A | 12/1966 | Fuchs |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,584,585 A | 6/1971 | Hansel et al. |
| 3,697,289 A | 10/1972 | Day et al. |
| 3,739,953 A | 6/1973 | Cretors |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | VandeWalker |
| 4,206,695 A | 6/1980 | Cretors |
| 4,288,686 A | 9/1981 | Cretors |
| 4,289,079 A | 9/1981 | Swistun |
| 4,329,068 A | 5/1982 | Neuner et al. |
| 4,331,124 A | 5/1982 | Seidel et al. |
| 4,337,584 A | 7/1982 | Johnson |
| 4,417,505 A | 11/1983 | Pietrobelli |
| 4,438,682 A | 3/1984 | King et al. |
| 4,444,553 A | 4/1984 | Christodoulou |
| 4,467,783 A * | 8/1984 | Hurley .................... A47J 27/17 126/349 |
| 4,494,314 A | 1/1985 | Gell, Jr. |
| 4,512,247 A | 4/1985 | Friedman |
| D285,404 S | 9/1986 | Wang |
| 4,648,719 A | 3/1987 | Roben et al. |
| 4,649,263 A | 3/1987 | Goodlaxson |
| 4,658,708 A | 4/1987 | Rastoin |
| 4,702,158 A | 10/1987 | Ishihara |
| D294,448 S | 3/1988 | Otto |
| 4,763,568 A | 8/1988 | Kiczek |
| 4,828,146 A | 5/1989 | Stein |
| 4,881,457 A | 11/1989 | Lyga et al. |
| 5,013,575 A | 5/1991 | Stadler et al. |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,154,161 A | 10/1992 | Rogers et al. |
| 5,176,069 A | 1/1993 | Chen |
| 5,180,898 A | 1/1993 | Alden et al. |
| 5,203,256 A | 4/1993 | Mueller |
| 5,237,912 A * | 8/1993 | Fins ...................... A47J 33/00 126/41 R |
| 5,263,405 A | 11/1993 | Simon |
| 5,301,601 A | 4/1994 | Cretors |
| 5,315,919 A | 5/1994 | Hoebergs |
| 5,332,102 A | 7/1994 | Sennett et al. |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee et al. |
| 5,513,558 A | 5/1996 | Erickson et al. |
| 5,539,671 A | 7/1996 | Albrecht et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,645,878 A | 7/1997 | Breslin et al. |
| 5,662,024 A | 9/1997 | Cretors et al. |
| D384,548 S | 10/1997 | Hsieh |
| 5,690,018 A | 11/1997 | Hansen |
| 5,694,830 A | 12/1997 | Hodgson et al. |
| 5,699,720 A | 12/1997 | Stein et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,857,403 A * | 1/1999 | Mann ...................... A23L 7/187 99/323.5 |
| 5,871,792 A | 2/1999 | Weiss et al. |
| 5,890,033 A | 3/1999 | Parker |
| 5,941,164 A * | 8/1999 | Stein ...................... G07F 9/105 99/323.5 |
| 5,979,301 A | 11/1999 | Perttola |
| 6,000,318 A | 12/1999 | Weiss et al. |
| 6,021,707 A | 2/2000 | Bauer et al. |
| D426,422 S | 6/2000 | Otto |
| 6,098,526 A | 8/2000 | Stein et al. |
| 6,123,011 A | 9/2000 | Cretors |
| 6,164,192 A | 12/2000 | Stein et al. |
| 6,164,193 A | 12/2000 | Perttola |
| 6,234,063 B1 | 5/2001 | Evers et al. |
| 6,234,064 B1 * | 5/2001 | Turrel ..................... A47J 27/14 99/323.11 |
| 6,331,323 B1 | 12/2001 | Adler-Nissen et al. |
| 6,374,727 B1 * | 4/2002 | Cretors ................... A23L 7/187 366/185 |
| 6,382,087 B1 | 5/2002 | Iiyama |
| 6,412,395 B1 | 7/2002 | Weiss et al. |
| 6,412,396 B1 | 7/2002 | Wright |
| 6,460,451 B1 | 10/2002 | Helman et al. |
| 6,461,033 B2 | 10/2002 | Palmer et al. |
| 6,534,103 B2 | 3/2003 | Weiss |
| 6,578,468 B1 | 6/2003 | Horn |
| 6,612,225 B1 | 9/2003 | Mann |
| 6,619,280 B1 * | 9/2003 | Zhou ..................... F23D 14/085 126/39 R |
| 6,669,304 B2 | 12/2003 | Binning |
| 6,672,201 B2 | 1/2004 | Evans, Sr. et al. |
| 6,872,923 B2 | 3/2005 | Cretors et al. |
| 6,914,226 B2 | 7/2005 | Ottaway |
| 7,082,891 B2 | 8/2006 | Watson |
| 7,259,357 B2 | 8/2007 | Walker |
| 7,285,300 B2 | 10/2007 | Allington et al. |
| 7,874,244 B1 | 1/2011 | Rhome |
| 8,011,622 B1 | 9/2011 | Guthrie |
| 8,201,492 B2 | 6/2012 | Cretors |
| D672,789 S | 12/2012 | Bongiovanni |
| 8,464,634 B2 | 6/2013 | Cretors et al. |
| 8,651,014 B2 | 2/2014 | Vidojevic et al. |

(56) References Cited

U.S. PATENT DOCUMENTS

| | | | |
|---|---|---|---|
| 8,794,129 | B2 | 8/2014 | Cretors |
| 8,869,679 | B2 | 10/2014 | Ryan et al. |
| 8,887,626 | B2 * | 11/2014 | Baker, Jr. ............... A47J 36/165 126/25 R |
| 9,144,247 | B2 | 9/2015 | Cretors |
| 9,198,532 | B2 * | 12/2015 | Barrows ............... A47J 27/004 |
| 9,408,496 | B2 | 8/2016 | Cretors |
| D802,982 | S | 11/2017 | Vidojevic |
| 2002/0147006 | A1 | 10/2002 | Coon et al. |
| 2003/0159591 | A1 | 8/2003 | Evans et al. |
| 2003/0168438 | A1 | 9/2003 | Zhou |
| 2004/0045444 | A1 | 3/2004 | Mann |
| 2004/0045542 | A1 * | 3/2004 | Zhou ............... F23D 14/085 126/39 R |
| 2004/0074397 | A1 * | 4/2004 | Calhoun ............... A23L 7/187 99/323.5 |
| 2004/0265993 | A1 | 12/2004 | Darling et al. |
| 2005/0056154 | A1 | 3/2005 | Fu |
| 2005/0086814 | A1 | 4/2005 | Huang |
| 2006/0149415 | A1 | 7/2006 | Richards |
| 2009/0041915 | A1 | 2/2009 | Biechteler |
| 2009/0056558 | A1 | 3/2009 | Cretors et al. |
| 2009/0126579 | A1 | 5/2009 | Cretors et al. |
| 2009/0145242 | A1 | 6/2009 | Pryor, Jr. et al. |
| 2009/0208621 | A1 | 8/2009 | Dotan |
| 2009/0223378 | A1 | 9/2009 | Cretors |
| 2010/0270282 | A1 | 10/2010 | Fernandez et al. |
| 2011/0014340 | A1 | 1/2011 | Spitzley et al. |
| 2011/0027434 | A1 * | 2/2011 | Cretors ............... A23P 20/10 426/290 |
| 2011/0076372 | A1 | 3/2011 | Cretors |
| 2011/0076373 | A1 | 3/2011 | Cretors et al. |
| 2011/0083562 | A1 | 4/2011 | Ryan et al. |
| 2011/0120317 | A1 | 5/2011 | Rhome |
| 2011/0274804 | A1 * | 11/2011 | Barrows ............... A47J 27/004 426/449 |
| 2012/0266756 | A1 | 10/2012 | Cretors |
| 2013/0022727 | A1 | 1/2013 | Sherwin |
| 2013/0276640 | A1 | 10/2013 | Cretors |
| 2013/0276641 | A1 | 10/2013 | Vidojevic |
| 2013/0280386 | A1 | 10/2013 | Cretors |
| 2013/0298781 | A1 * | 11/2013 | Ganuza ............... A47J 37/0623 99/447 |
| 2014/0311356 | A1 * | 10/2014 | Daniels ............... A47J 37/0713 99/340 |
| 2015/0064320 | A1 | 3/2015 | Cretors |

FOREIGN PATENT DOCUMENTS

| | | |
|---|---|---|
| DE | 20120429 U1 | 7/2002 |
| EP | 0364071 | 4/1990 |
| FR | 2401387 | 3/1979 |
| GB | 0688223 | 3/1953 |
| GB | 717654 | 10/1954 |
| JP | S59135849 | 8/1984 |
| JP | 2006081587 A | 3/2006 |
| WO | WO-9310698 | 6/1993 |
| WO | WO-9706699 A1 | 2/1997 |
| WO | WO-2004054384 A1 | 7/2004 |
| WO | WO-2012145717 A1 | 10/2012 |

OTHER PUBLICATIONS

Platvoet et al. "Process Burner 101". American Institute of Chemical Engineers; Retrieved on Aug. 19, 2019 from https://www.aiche.org/sites/default/files/cep/20130835.pdf Copyright 2013 (Year: 2013).*

"How to Succeed in the Caramel Corn Business," Gold Medal Products Company, Copyright 2011, gmpopcorn.com, 24 pages.

C. Cretors and Co., "Diplomat" product manual for models DI20C, DI32C, DI20F, DI32F, DI205, TDI205, TDI206, DI325 and TDI326; 1996, 58 pages.

C. Cretors and Co., "Diplomat" product manual for models DI20CP, DI32CP, DI20FP and DI32FP; 1989, 62 pages.

C. Cretors and Co., Multi-product sell sheet for "The New Diplomat Counter Showcase" and "Thunder Kettle" for models G48E, EPR48E5 and PR48E5; dated 1990, 2 pages.

Cretors Coater Mixer Tumbler, http://www.cretors.com/store/catalog.asp?item=39&category_id=3, Copyright 2014, 1 page.

Gold Medal Products Co., "Funfood Equipment & Supplies" catalog; vol. 56, dated 2000, 108 pages.

Loeb Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, 33 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

* cited by examiner

POPCORN MACHINES HAVING GAS-FIRED RADIANT BURNERS AND ASSOCIATED SYSTEMS AND METHODS

CROSS-REFERENCE TO RELATED APPLICATION(S)

The present application claims priority to U.S. Provisional Application No. 62/319,088, filed Apr. 6, 2016, and entitled "POPCORN MACHINES HAVING GAS-FIRED RADIANT BURNERS AND ASSOCIATED SYSTEMS AND METHODS," the entirety of which is incorporated by reference herein.

TECHNICAL FIELD

The following disclosure relates generally to popcorn machines for popping corn and, more particularly, to popcorn machines having gas-fired radiant burners and associated systems and methods.

BACKGROUND

Existing popcorn machines generally heat and pop popcorn via either conduction or convection. For example, a variety of conventional popcorn machines utilize electric heating elements to heat an associated popping kettle via conduction from the heating elements to the kettle. In other popcorn machines, an electric heating element or a gas flame heats air, which is then directed at popcorn kernels to heat and pop the kernels via forced convection. As an alternative to conduction and convection, a common consumer-level method for popping popcorn utilizes radiation (e.g., household microwave ovens). These and other prior art popcorn machines and popcorn popping methods have relatively high energy requirements and suffer from generally low energy efficiencies. For example, many electrically powered popcorn machines use inefficient resistive heating elements that require significant amounts of electrical energy. Similarly, gas powered popcorn machines that use forced convection produce significant amounts of waste heat. Even for relatively small popcorn machines, the energy inefficiencies can be expensive. For large commercial machines, the associated costs can be prohibitive.

DETAILED DESCRIPTION

The following disclosure describes various embodiments of popcorn machines and associated systems and methods. In some embodiments, a popcorn machine includes a kettle assembly supported by a base having a gas-fired radiant burner. The kettle assembly includes a heating plate that separates an upper portion from a lower portion. The heating plate can include a coated lower surface to absorb radiant heat, and the radiant burner can include a heating element positioned to direct radiant heat toward the lower surface of the heating plate. In several embodiments, a coupler can extend through an opening in the heating element to connect a motor in the base with a mixer in the upper portion of the kettle assembly. In other embodiments, the popcorn machines described herein and the associated devices, systems and methods can have different configurations, components, and/or procedures. Still other embodiments may eliminate particular components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1 and 2.

As discussed above, conventional popcorn machines can be relatively inefficient and can consume significant amounts of energy. The present technology includes several embodiments of popcorn machines and associated systems and methods that have improved energy efficiencies, and thereby reduce energy consumption and associated costs. Certain details are set forth in the following description and FIGS. 1 and 2 to provide a thorough understanding of various embodiments of the disclosure. To avoid unnecessarily obscuring the description of the various embodiments of the disclosure, other details describing well-known structures and systems often associated with popcorn machines, radiant burners, and the components or devices associated with the manufacture of conventional popcorn machines or conventional radiant burners are not set forth below. Moreover, many of the details and features shown in the Figures are merely illustrative of particular embodiments of the disclosure. Accordingly, other embodiments can have other details and features without departing from the spirit and scope of the present disclosure. In addition, the various elements and features illustrated in the Figures may not be drawn to scale. Furthermore, various embodiments of the disclosure can include structures other than those illustrated in the Figures and are expressly not limited to the structures shown in the Figures.

Figure 1:
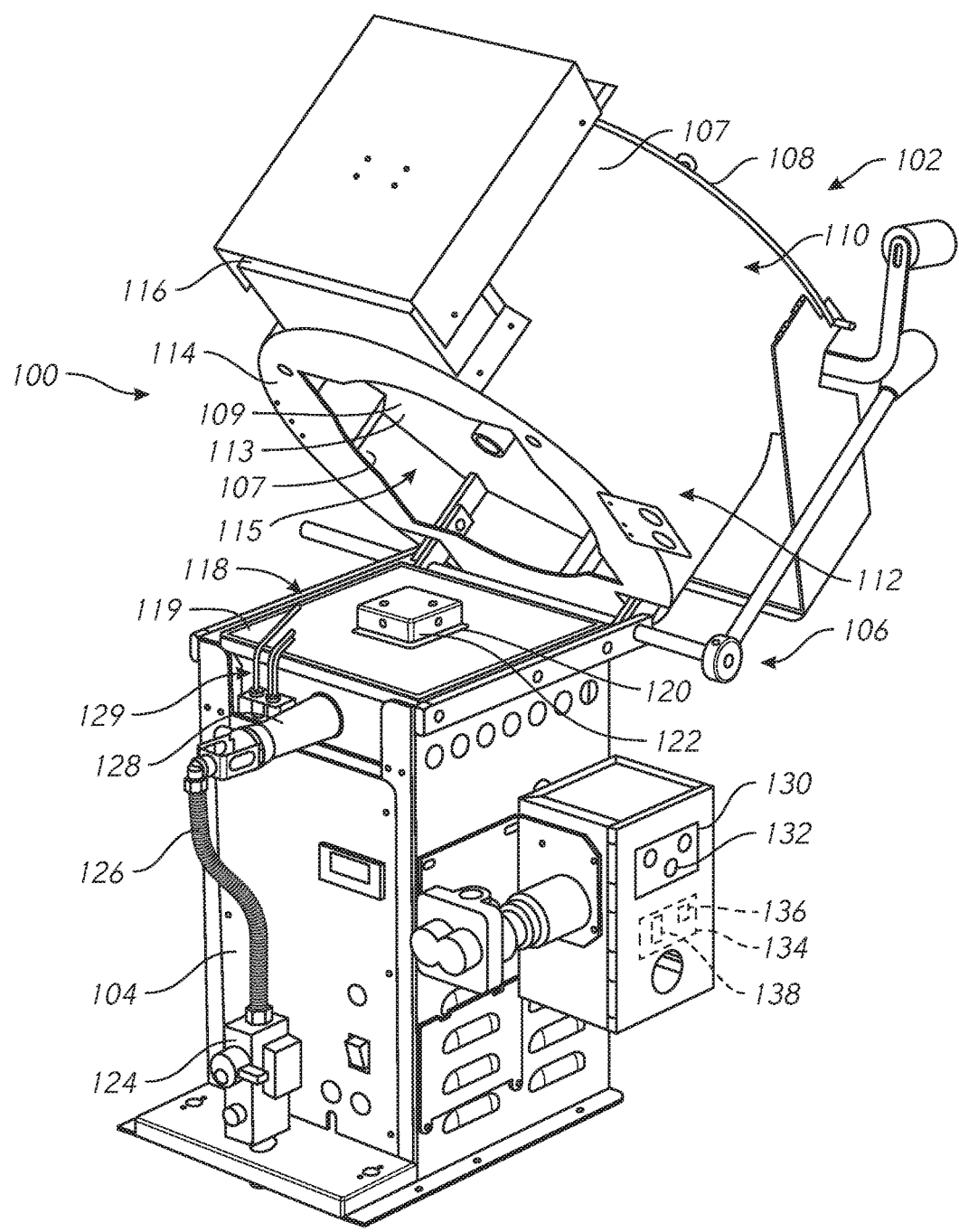
FIG. 1 is an isometric view of a popcorn machine configured in accordance with an embodiment of the present technology.

FIG. 1 is an isometric view of a popcorn machine 100 configured in accordance with an embodiment of the present disclosure. In the illustrated embodiment, the popcorn machine 100 includes a kettle or kettle assembly 102 that is rotatably coupled to a base 104 via a hinge assembly 106. The kettle assembly 102 includes a kettle wall 107, a lid 108, and a heating plate that forms a kettle bottom 109. The kettle bottom 109 separates an upper portion 110 of the kettle assembly 102 from a lower portion 112. In the illustrated embodiment, the kettle bottom 109 is a circular plate, and the kettle wall 107 is a cylindrical wall surrounding the kettle bottom 109. In other embodiments, the kettle assembly 102 can include components having other shapes and configurations (e.g., rectangular kettle assemblies, etc.). In several embodiments, the kettle assembly 102, the base 104, the hinge assembly 106, portions or subcomponents thereof, and/or other components of the popcorn machine 100 can be at least generally similar to components described in U.S. Pat. No. 2,537,744, the contents of which is incorporated herein by reference in its entirety.

The kettle bottom 109 includes a lower surface 113 that can be coated with a heat absorbent coating (e.g., silicon-based high temperature black paint). For example, in some embodiments, the kettle bottom can be coated with Pyromark® paint (available from LA-CO Industries, Elk Grove Village, Ill.). As described in more detail below, the heat absorbent coating can increase the amount of radiant heat absorbed by the kettle bottom 109, thereby increasing the energy efficiency of the popcorn machine 100. The lower portion 112 of the kettle assembly 102 includes a kettle shroud 114 that extends inwardly from the kettle wall 107. The kettle wall 107, the kettle bottom 109, and the kettle shroud 114 can at least partially define a heating cavity 115. The cavity 115 can contain and direct radiant and/or conductive heat to the kettle bottom 109. An exhaust trunk 116 is connected to an opening (not shown) in the kettle wall 107 to direct combustion products out of the cavity 115.

The base 104 includes gas-fired radiant burner 118 having a heating element 119. The heating element 119 can be a plate formed from a ceramic material that includes a plurality of openings or perforations for the passage and combustion of gas (e.g., natural gas (methane), propane, etc.). A burner shroud 122 can extend through a drive system opening 120 in the heating element 119. As described in more detail below, the burner shroud 122 can prevent the leakage of gas and can shield drive system components that extend between the base 104 and the kettle assembly 102. A gas supply valve 124 is operably coupled to the burner 118 via a gas supply line 126 and a gas inlet port 128. The gas supply valve 124 can initiate the flow of gas to the burner 118, vary the volume of gas delivered to the burner 118, and/or stop the flow of gas to the burner 118. An igniter 129 is positioned to ignite the gas at the heating element 119.

In the illustrated embodiment of FIG. 1, the popcorn machine 100 includes an operator control panel 130 (shown schematically) having one or more user interface devices 132 (e.g., push-buttons, switches, keypads, display screens, touchscreens, and/or other input or output devices) that are operably coupled to a controller 134 (also shown schematically). The controller 134 can include a processor 136 for executing computer-readable operating instructions stored on a memory 138. The processor 136 can include a programmable logic controller (PLC) and/or other processing devices or components suitable for executing computer-readable instructions for controlling operations of the popcorn machine 100 in accordance with operator input received via the control panel 130. For example, in one embodiment the operator may use the control panel 130 to operate the radiant burner 118 and the mixer 202, set popping time, set popping temperature, etc.

Figure 2:
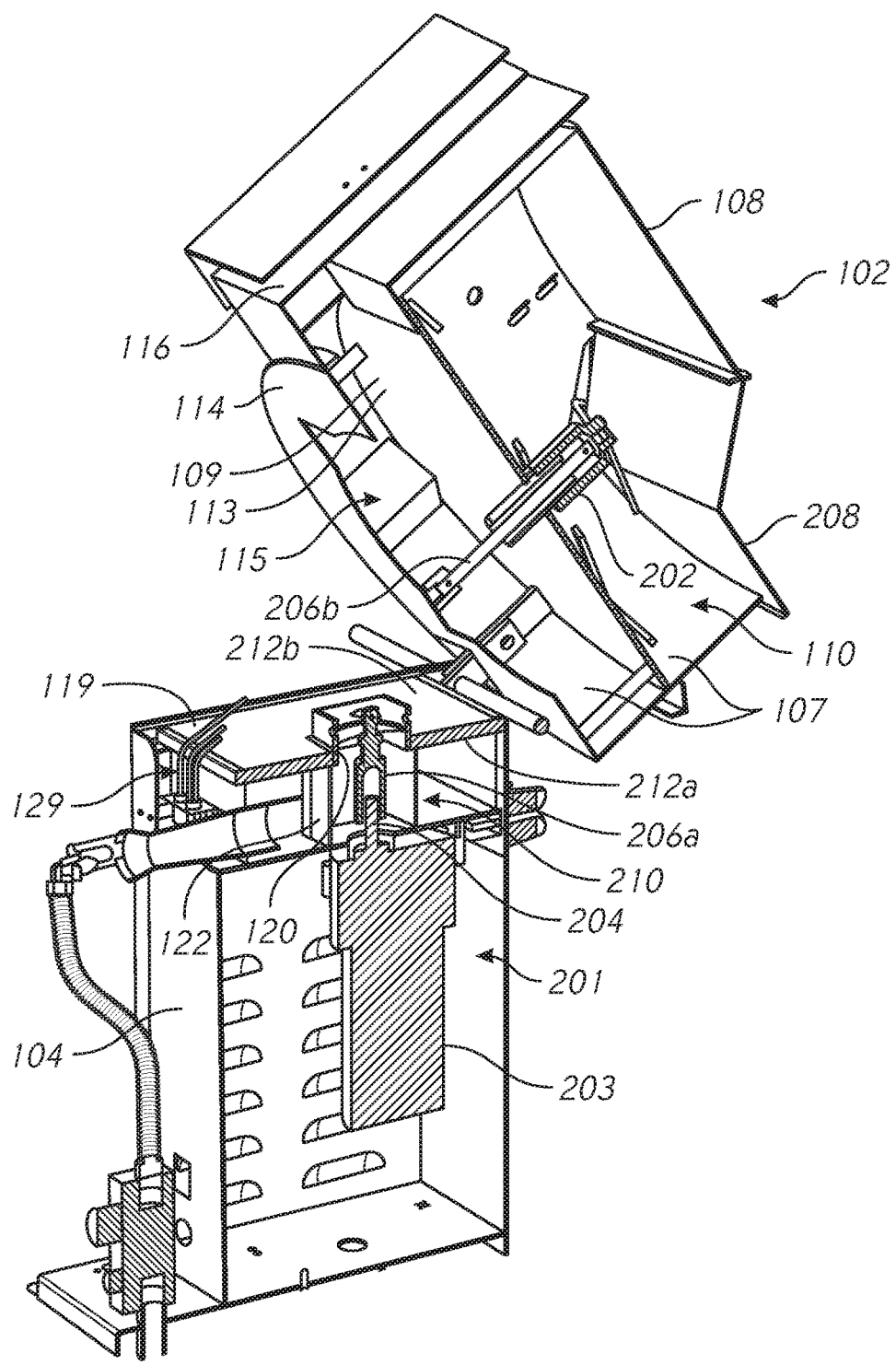
FIG. 2 is a cross-sectional isometric view of the popcorn machine of FIG. 1 configured in accordance with an embodiment of the present technology.

FIG. 2 is a cross-sectional isometric view of the popcorn machine of FIG. 1 configured in accordance with an embodiment of the present technology. In the illustrated embodiment of FIG. 2, the popcorn machine 100 includes a drive system 201 that is operably couplable to the mixer 202. The drive system 201 includes a motor 203 (e.g., an electric motor) positioned in the base 104 and having a drive shaft 204. The drive shaft 204 can be operably connected to the mixer 202 via a first coupler 206a and a second coupler 206b (identified together as the coupler 206). The first coupler 206a is operably attached to the drive shaft 204 and extends upwardly through the burner shroud 122. The second coupler 206b is operably coupled to the mixer 202 and extends downwardly through the kettle bottom 109. As described in more detail below, the kettle assembly 102 is rotatable about the hinge assembly 106 to empty the kettle via a pivotable portion 208 of the lid 108. Rotation of the kettle assembly 102 also couples and decouples the first coupler 206a and the second coupler 206b.

The base 104 includes a gas plenum 210 that is connected to the gas inlet port 128. The gas plenum 210 is shaped as a rectangular channel extending around the burner shroud 122 and positioned adjacent to a first side 212a of the heating element 119. The gas plenum 210 receives gas from the gas inlet port 128 and provides a dispersed volume for delivery of the gas to the first side 212a of the heating element 119. The burner shroud 122 forms an inner wall of the gas plenum 210 and can help to prevent the escape of gas via the drive system opening 120 in the heating element 119. As described in more detail below, the gas passes from the plenum 210, flows into the heating element 119 via the first side 212a (e.g., the lower side), and is then combusted at or near a second side 212b (e.g., an upper side) of the heating element 119. The burner shroud 122 can at least partially protect the first coupler 206a from intense heat that is generated by the combustion at the second side 212b of the heating element 119.

To better illustrate the components of the popcorn machine 100, the kettle assembly 102 is shown in a partially rotated position in FIGS. 1 and 2. During cooking operations, however, the kettle assembly 102 is initially positioned with the kettle bottom 109 level with respect to the base 104. In this cooking position, the cavity 111 is directly above the heating element 119, the kettle shroud 114 extends around a perimeter of the heating element 119, and the couplers 206 are coupled.

In operation, at the beginning of a popping cycle, the kettle assembly 102 is initially in the cooking position (kettle bottom 109 level with respect to the base 104). While the kettle assembly 102 is in the cooking position, the first coupler 206a is engaged with the second coupler 206b, and the motor 203 is thereby operably coupled to the mixer 202. Prior to initiating a popping cycle, the pivotable portion 208 of the lid 108 is pivoted to an open position, and popcorn kernels and cooking oil are added to the upper portion 110 of the kettle assembly 102. An operator then initiates a popping cycle via the control panel 130. The initiation of the popping cycle includes energization of the motor 203 to rotate the mixer 202 via the shaft 204 and the coupler 206. The rotating mixer 202 stirs the popcorn kernels and oil in the upper portion 110 of the kettle assembly 102. The initiation of the popping cycle also includes opening of the gas supply valve 124 and ignition of gas at the heating element 119 via the igniter 129. In particular, gas flows through the gas supply line 126 and the inlet port 128, and into the gas plenum 210. Gas fills the plenum 210 and passes from the first side 212a of the heating element 119 to the second side 212b via openings or perforations in the heating element 119. As gas exits the second side 212b of the heating element 119, the igniter 129 ignites the gas.

The heating element 119 can be designed to facilitate combustion of the gas at or near the second surface 212b, and/or at least partially within the openings or perforations of the heating element 119. The proximity of the combusting gas to the structures of the heating element 119 transfers significant heat to the material of the heating element 119 (e.g., the ceramic material), thereby increasing the temperature of the heating element 119. In several embodiments, the heating element 119 is a ceramic material (e.g., a perforated ceramic plaque, a ceramic foam, a woven ceramic fiber, etc.) that can emit radiation when heated by combusting gas to an appropriate operating temperature (e.g., 1500-2000 degrees Fahrenheit (800-1100 degrees Celsius)). In particular, when heated to an appropriate operating temperature, the heating element 119 can emit large amounts of infrared radiation. In some embodiments, the operating temperature is 1550-1650 degrees Fahrenheit (840-900 degrees Celsius). The infrared radiation travels from the heating element 119, through the cavity 115 and impinges the lower surface 113 of the kettle bottom 109. The lower surface 113 absorbs the infrared radiation, heating the kettle bottom 109 to efficiently heat and pop the popcorn in the upper portion 110.

In the illustrated embodiment of FIGS. 1 and 2, the heating element 119 is a planar rectangular plate with the opening 120 extending through a center of the heating element 119. In other embodiments, the heating element 119 can have a variety of other shapes (e.g., circular, oval, etc.). Additionally, the opening 120 can be positioned in alternative locations (e.g. along an edge of the heating element). The heating element 119 can include a variety of design characteristics that increase the energy efficiency of the burner 118. For example, the size, quantity, and geometry of the openings or perforations in the heating element 119 can be designed to maintain combustion near the second surface 212*b*. Additionally, the heating element 119 and/or other components can be positioned to increase the transfer of radiant heat to the kettle bottom 109. For example, the kettle shroud 114 can extend around the perimeter of the heating element 119 with little or no gap between the kettle shroud 114 and the heating element 119. The close-fit of the kettle shroud 114 and the heating element 119 can help to reduce the opportunity for radiative heat to escape from the cavity 115. Accordingly, a majority of the radiative heat emitted by the heating element 119 can be absorbed by the kettle bottom 109 or other parts of the kettle assembly 102 (e.g., the kettle shroud 114 and the kettle wall 107 encircling the cavity 115.

In several embodiments, the kettle shroud 114 and the interior of the kettle wall 107 enclosing the cavity 115 can be relatively reflective (e.g., stainless steel). Embodiments that also include a coated lower surface 113 on the kettle bottom 109 can have increased efficiency by increased absorption of the radiant heat by the absorbent lower surface 113 versus the reflective kettle shroud 114 and the reflective wall 107. In particular, the kettle wall 107 and kettle shroud 114 are at least partially exposed to the environment surrounding the popcorn machine 100, and can thereby conduct and radiate at least some heat to the surrounding environment. In contrast, the kettle bottom 109 is positioned entirely within the kettle assembly 102, and transmits nearly all of the heat that it receives into the upper portion 110 of the kettle assembly 102 to heat and pop the popcorn. Accordingly, the relatively higher absorption of heat by the lower surface 113, versus the relatively lower absorption by the reflective kettle shroud 114 and the reflective kettle wall 107, can help to reduce the amount of heat lost to the surrounding environment, and thereby increase the efficiency of the popcorn machine 100.

Regardless of whether the lower surface 113 includes a coating, the positioning of the heating element 119 with respect to lower surface 113 can help to ensure that a majority, or at least a large portion, of the radiant heat is absorbed by the kettle bottom 109. That is, as shown in the illustrated embodiments of FIGS. 1 and 2, the heating element 119 is positioned to direct radiant heat away from the second surface 212*b* and directly toward the kettle bottom 109 when the kettle assembly 102 is in the cooking position. Accordingly, the kettle bottom 109 receives a significantly higher amount of infrared radiation than the kettle walls 107 and the kettle shroud 114.

In several embodiments, popcorn machines configured in accordance with the present technology can include more than one gas-fired radiant burner. For example, two or more gas-fired radiant burners can be positioned to provide heating to a kettle assembly or another assembly or component for heating and popping popcorn. In several embodiments, each of the gas-fired radiant burners can provide different amounts of heating (e.g., zoned or differential heating). In at least some embodiments, the gas-fired radiant burners can be positioned to provide zoned heating in a manner at least generally similar to that described in U.S. patent application Ser. No. 12/891,722, filed Sep. 27, 2010, and entitled "POPCORN MACHINES AND OTHER MACHINES HAVING REVERSIBLE FOOD MOVING DEVICES FOR POPPING POPCORN AND PRODUCING OTHER TYPES OF EXPANDED FOODS," which is incorporated herein by reference in its entirety.

In addition to the embodiments illustrated in FIGS. 1 and 2, popcorn machines configured in accordance with the present technology can include gas-fired radiant burners positioned to heat and pop popcorn in a variety of kettles, kettle assemblies, and/or other assemblies or components. In several embodiments, one or more gas-fired radiant burners can be positioned to heat and pop popcorn in a trough shaped cooking assembly such as those described in U.S. patent application Ser. No. 12/891,722, which was incorporated by reference above. In still other embodiments, gas-fired radiant burners can be positioned to heat and pop popcorn in flow through cooking decks such as those described in U.S. Pat. No. 9,144,247, filed Apr. 20, 2012, and entitled "POPCORN POPPING MACHINES AND OTHER MACHINES HAVING FLOW THROUGH DECKS FOR POPPING POPCORN AND PRODUCING OTHER TYPES OF EXPANDED FOOD," which is incorporated herein by reference in its entirety. In other embodiments configured in accordance with the present technology, gas-fired radiant burners can be positioned to heat and pop popcorn within cooking assemblies having other shapes, sizes and/or configurations.

Popcorn machines configured in accordance with the present technology can provide significant energy savings over conventional popcorn machines. For example, compared to a similarly sized gas powered popcorn machine that primarily heats via conduction from combusted gas, the primarily radiant heating provided by the present technology can reduce gas consumption by 35% or more. This significant drop in energy requirements can provide a similar reduction in operating costs, which can make a significant difference to the profitability of commercial popcorn production. In addition to the embodiments shown in FIGS. 1 and 2, other popcorn machines configured in accordance with the present technology can include gas-fired radiant burners positioned to direct radiant heat to a variety of cooking or popping containers. Such embodiments can have similarly reduced energy consumption when compared to conventional popcorn machines.

From the foregoing, it will be appreciated that specific embodiments have been described herein for purposes of illustration, but that various modifications may be made without deviating from the spirit and scope of the present technology. Those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

I claim:
1. A popcorn machine, comprising:
 a kettle assembly including
  an upper portion to receive popcorn kernels;

a mixer positioned within the upper portion to mix the popcorn kernels;
a lower portion; and
a heating plate separating the upper portion from the lower portion, the heating plate having a coated lower surface to absorb radiant heat; and
a base supporting the kettle assembly, wherein the kettle assembly is pivotable relative to the base between a cooking position and a dump position, the base including
a gas-fired radiant burner having a heating element positioned to direct radiant heat toward the lower surface of the heating plate when the kettle assembly is in the cooking position, wherein the heating element includes an opening extending therethrough;
a drive motor; and
a coupler extending through the opening to operably couple the drive motor to the mixer when the kettle assembly is in the cooking position, wherein operation of the motor rotates the mixer within the upper portion of the kettle assembly, and wherein the coupler is operably decoupled from the mixer when the kettle assembly is in the dump position.

2. The popcorn machine of claim 1 wherein the heating element is formed from a ceramic material, wherein the heating element is shaped as a planar rectangular plate, and wherein the opening extends through a center of the heating element.

3. The popcorn machine of claim 1 wherein the lower portion includes a kettle shroud at least partially defining a cavity in the lower portion, and wherein the kettle shroud is positioned to extend around a perimeter of the heating element and contain heated air within the cavity.

4. A popcorn machine, comprising:
a kettle assembly including
an upper portion to receive popcorn kernels;
a mixer positioned within the upper portion to mix the popcorn kernels;
a lower portion; and
a heating plate separating the upper portion from the lower portion, the heating plate having a coated lower surface to absorb radiant heat; and
a base supporting the kettle assembly, the base including
a gas-fired radiant burner having a heating element, wherein the heating element includes a first side and a second side, opposite the first side, wherein the heating element includes an opening extending therethrough, and wherein the second side of the heating element is positioned to direct radiant heat toward the lower surface of the heating plate;
a gas plenum adjacent the first side of the heating element;
a burner shroud extending through the opening and through the gas plenum, the burner shroud positioned to prevent gas from passing through the opening;
a drive motor; and
a coupler extending through the opening to operably couple the drive motor to the mixer, wherein operation of the motor rotates the mixer within the upper portion of the kettle assembly.

5. The popcorn machine of claim 4 wherein the gas plenum comprises a channel extending around a perimeter of the burner shroud.

6. The popcorn machine of claim 1, further comprising a burner shroud extending through the opening and positioned between the heating element and the coupler.

7. A popcorn machine, comprising:
a kettle including a mixer, a lower portion defining a cavity, and a bottom, wherein the kettle is configured to contain popcorn kernels;
a gas-fired radiant burner positioned beneath the kettle and including a heating element and a ceramic material, wherein the heating element is configured to heat the ceramic material, and wherein the ceramic material is positioned to direct radiant heat toward the kettle bottom to heat the kettle and pop the popcorn kernels therein,
wherein the kettle is pivotable relative to the gas-fired radiant burner between a cooking position and a dumping position, and
wherein, in the cooking position, the heating element is positioned at least partially within the cavity; and
a motor operably couplable to the mixer via an opening in the ceramic material.

8. The popcorn machine of claim 7 wherein the kettle bottom includes a lower surface having a coating, and wherein the coating is configured to absorb the radiant heat.

9. A popcorn machine, comprising:
a kettle configured to contain popcorn kernels, wherein the kettle includes a lower portion defining a cavity;
a gas-fired radiant burner positioned beneath the kettle and including a heating element configured to heat the kettle and pop the popcorn kernels therein,
wherein the kettle is pivotable relative to the gas-fired radiant burner between a cooking position and a dumping position, and
wherein, in the cooking position, the heating element is positioned at least partially within the cavity;
a mixer positioned in the kettle to mix the popcorn kernels;
a motor;
an opening in the radiant burner; and
a coupler extending from the motor, through the opening, and coupling the motor to the mixer when the kettle is in the cooking position.

10. The popcorn machine of claim 9 wherein the opening extends through the heating element, and wherein the popcorn machine further comprises a burner shroud positioned between the coupler and the heating element.

11. A popcorn machine comprising:
a kettle configured to contain popcorn kernels;
a gas-fired radiant burner positioned beneath the kettle and configured to heat the kettle and pop the popcorn kernels therein, wherein the radiant burner includes
a heating element having a first side and a second side, opposite the first side, wherein the second side is positioned toward the kettle;
a gas plenum adjacent the first side of the heating element; and
a gas inlet port extending into the gas plenum, wherein the gas inlet port is configured to direct gas into the gas plenum for combustion at the heating element;
an opening extending through the heating element;
a burner shroud extending through the opening and through the gas plenum;
a mixer rotatably positioned in the kettle;
a motor; and
a coupler extending through the burner shroud and operably coupling the motor to the mixer.

12. The popcorn machine of claim 11 wherein the kettle includes a bottom, and wherein the heating element is positioned to direct radiant heat toward the kettle bottom.

13. The popcorn machine of claim 12 wherein the heating element includes a ceramic material.

14. A popcorn machine for popping popcorn via radiant heat, the popcorn machine comprising:
- a gas-fired radiant burner having a heating element, wherein the heating element includes a gas burning ceramic material;
- a kettle assembly having a kettle bottom with a lower surface, wherein the lower surface is positioned to receive radiant heat from the heating element, wherein the kettle assembly is pivotable relative to the heating element between a cooking position and a dump position;
- a mixer positioned within the kettle and configured to mix the popcorn therein; and
- a motor configured to be (a) operably coupled to the mixer in the cooking position to rotate the mixer within the kettle and (b) operably decoupled from the mixer in the dump position.

15. The popcorn machine of claim 14 wherein the heating element has a first side and a second side, opposite the first side, and wherein the popcorn machine further includes a gas plenum adjacent the first side of the heating element, and wherein the heating element is positioned to direct gas from the first side toward the second side, and wherein the second side is positioned to emit radiant heat toward the kettle bottom.

16. The popcorn machine of claim 14 wherein the kettle assembly further includes a shroud extending around a perimeter of the heating element to contain heat within the kettle assembly.

17. The popcorn machine of claim 14 wherein the lower surface of the kettle bottom includes a coating configured to absorb radiant heat.

18. The popcorn machine of claim 14 wherein the heating element includes an opening, wherein the popcorn machine further includes a drive system configured to operably couple the motor to the mixer, and wherein a portion of the drive system extends through the opening.

* * * * *